United States Patent [19]

Zeman

[11] Patent Number: 4,852,806
[45] Date of Patent: Aug. 1, 1989

[54] SPRAY STRUCTURES FOR USE IN WATERING PLANTS

[76] Inventor: David Zeman, c/o Disco, P.O. Box 42040, Las Vegas, Nev. 89116

[21] Appl. No.: 132,959

[22] Filed: Dec. 15, 1987

[51] Int. Cl.[4] .......................... B05B 1/04; B05B 15/06
[52] U.S. Cl. .................................... 239/276; 239/518; 239/520; 47/48.5
[58] Field of Search ........................ 239/518, 520–524, 239/275, 276, 280, 285; 248/87; 47/48.5, 79, 27

[56] References Cited

U.S. PATENT DOCUMENTS

| | | | |
|---|---|---|---|
| 238,295 | 3/1881 | Killan | 239/521 |
| 277,260 | 5/1883 | Free | 239/521 |
| 604,036 | 5/1898 | Fry | 239/521 |
| 687,378 | 11/1901 | Leahy | 239/521 |
| 1,271,939 | 7/1918 | Reeves | 239/521 |
| 2,065,549 | 12/1936 | Balensiefer | 239/523 |
| 2,186,551 | 1/1940 | Lyon | 239/523 |
| 2,527,388 | 10/1950 | Barker | 239/523 |
| 2,903,190 | 9/1959 | Deit | 239/597 |
| 3,101,176 | 8/1963 | Goss | 239/521 |
| 3,385,525 | 5/1968 | Jacobs | 239/597 |
| 3,595,524 | 7/1971 | Mominee | 251/342 |
| 3,612,409 | 10/1971 | Henning | 239/602 |
| 3,638,863 | 2/1972 | Roberts | 239/276 |
| 3,750,956 | 8/1973 | Mastman | 239/276 |
| 3,758,986 | 9/1973 | Roberts | 239/523 |
| 3,788,552 | 1/1974 | Roberts | 239/276 |
| 4,014,471 | 3/1977 | McGrane | 239/521 |

FOREIGN PATENT DOCUMENTS 2374962  8/1978  France .................. 239/276

Primary Examiner—Andres Kashnikow
Assistant Examiner—Karen B. Merritt
Attorney, Agent, or Firm—E. D. O'Brian

[57] ABSTRACT

One piece spray structures can be constructed so as to include a body shaped so as to hold a slotted nipple which directed toward a deflecting surface in the body. The body is preferably integral with a stake capable of supporting the body and the nipple in such a manner that when a tube is located on the nipple water will pass form the tube against the deflecting surface and be deflected outwardly away from the body. Diverging side walls are located along the deflecting surface so as to define a control slot through which the water has to pass in combination with the end of the tube on the nipple and the deflecting surface. If desired walls may be located so as to overhand the cavity generally above the defecting surface. Several nipples may be located on the body. When this is done preferably each nipple is used so as to distribute water differently than the other nipple on the body.

18 Claims, 3 Drawing Sheets

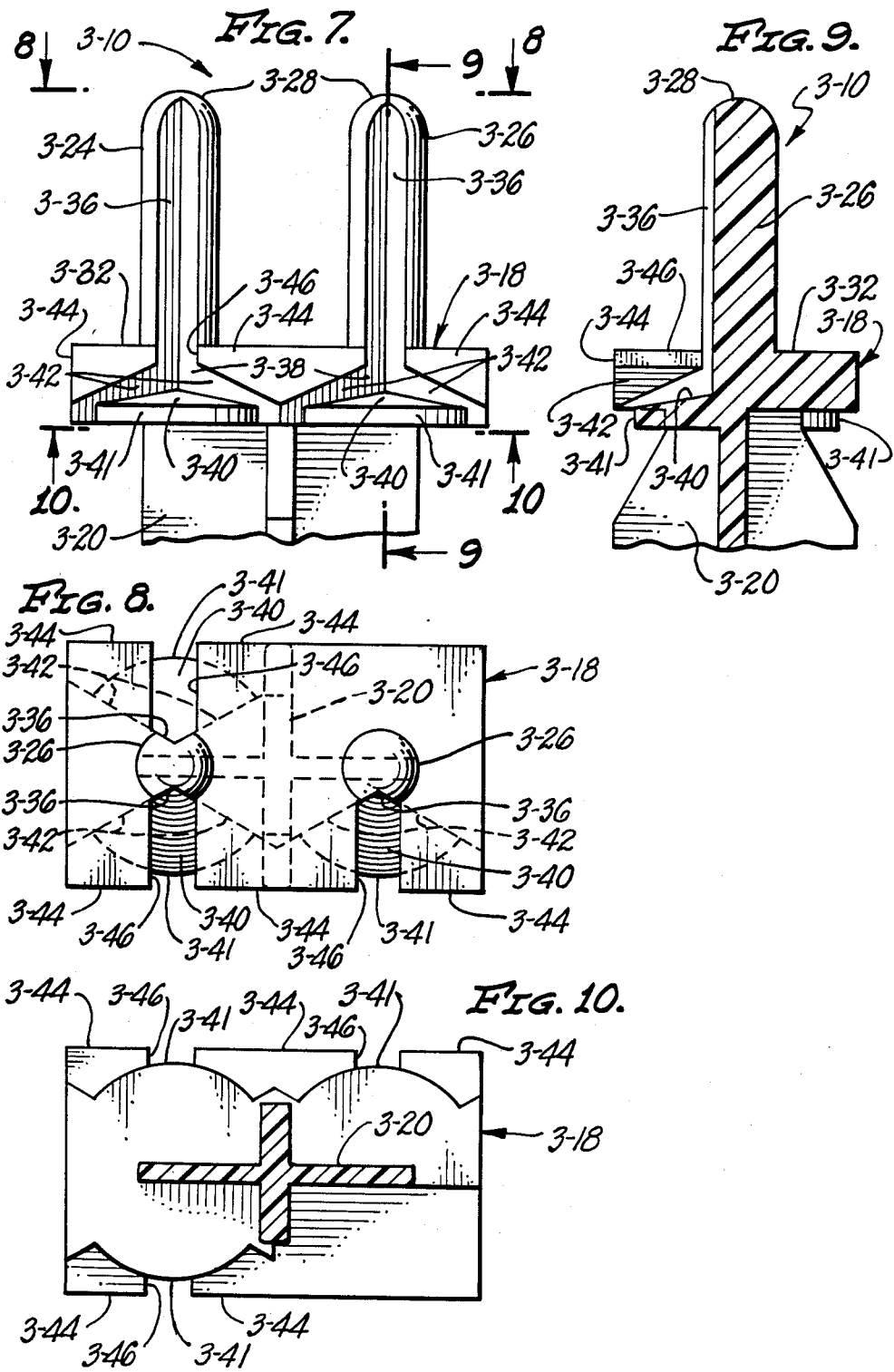

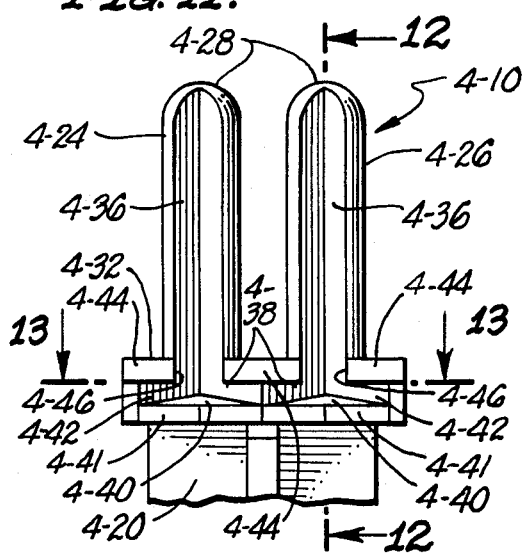
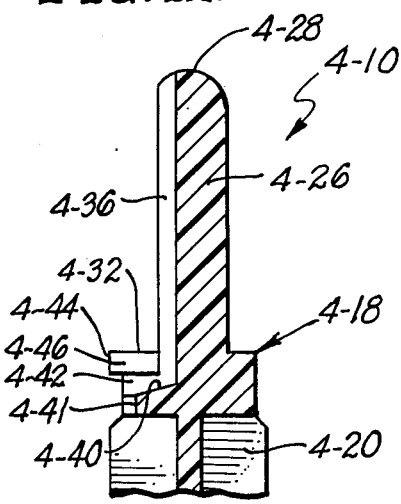
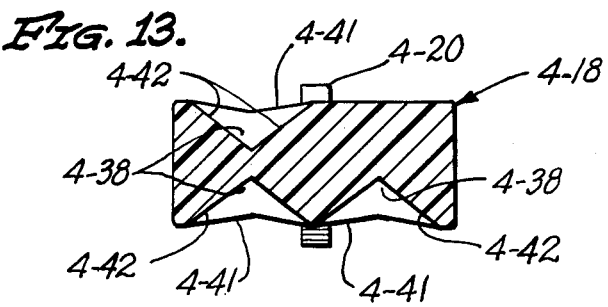

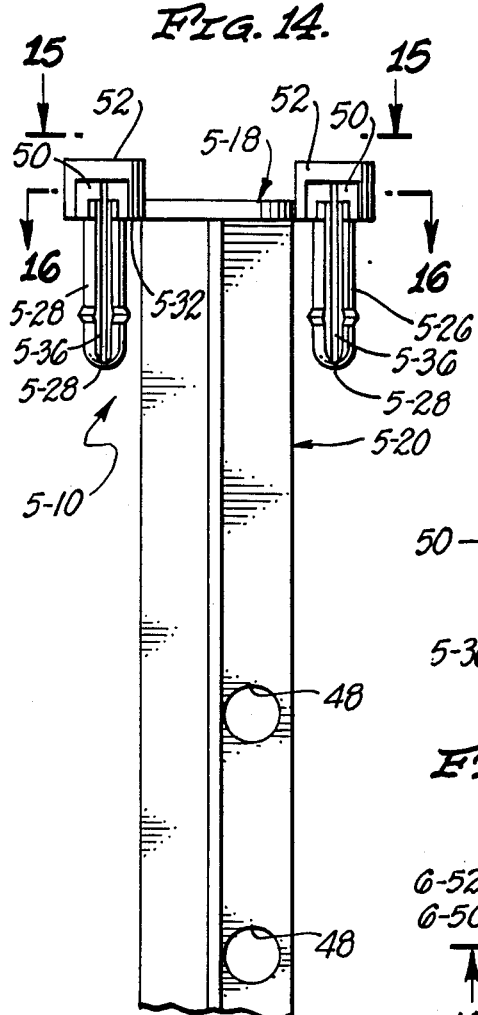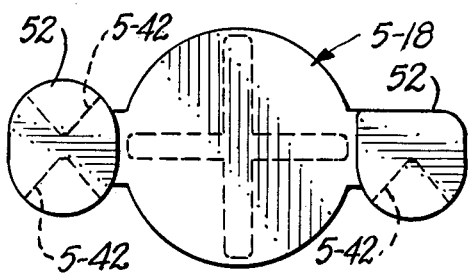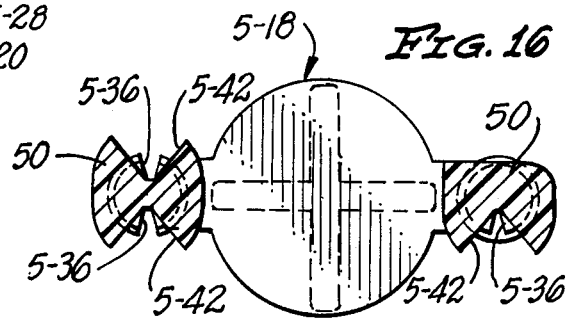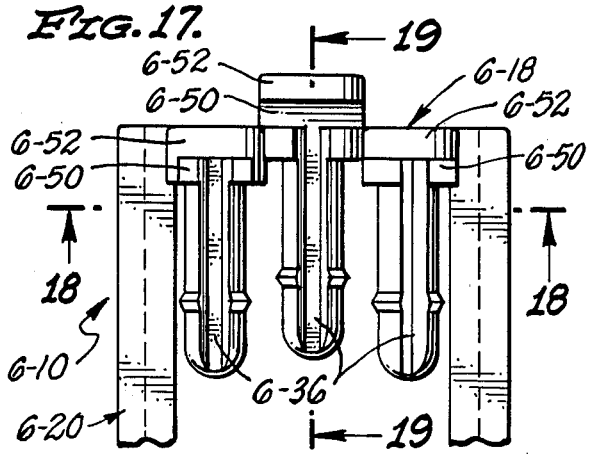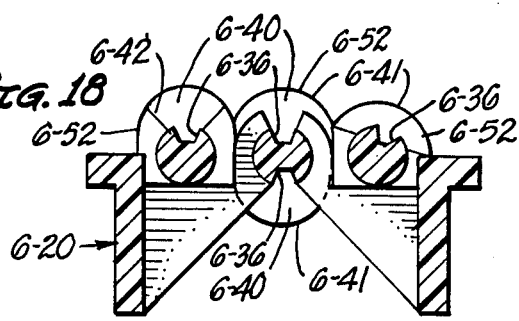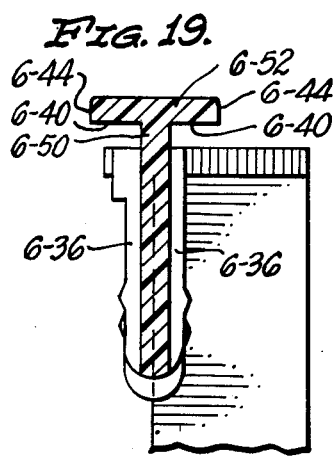

SPRAY STRUCTURES FOR USE IN WATERING PLANTS

BACKGROUND OF THE INVENTION

The invention set forth in this specification pertains to new and improved spray structures for use in watering plants. More specifically it pertains to new and improved spray structures which are adapted to be located in a fixed location and which are adapted to be used in watering only a limited area or a number of plants.

Many different types of drippers and spray structures are used and have been proposed for such use. As the irrigation field has developed many individuals have found it desirable to use spray structures which are constructed so as to each include an elongated nipple which is adapted to receive the end of a watering tube, a deflecting surface located so as to receive and deflect water from the tube passing through the nipple and a support for the nipple and deflecting surface so that the entire spray structure can be located in such a manner that the water hitting against the deflecting surface is directed toward the plant or area to be watered using the spray structure.

In the past spray structures reasonably corresponding to those described in the preceding paragraph have been formed in many different manners. An older patent relating to a spray structure having the various parts indicated in the preceding discussion is the Free U.S. Pat. No. 277,260 entitled "Grain and Fertilizer Spreading Attachment For Drills" issued in 1883. The fact that this patent is "prior art" relative to spray watering apparatus is indicated by the fact this is classified by the U.S. Patent and Trademark Office along with a variety of different although related liquid—including water-spraying devices which are adapted to be attached to ends of hoses and the like.

A comparison between the noted Free U.S. patent and the more recent Mominee U.S. Pat. No. 3,595,524 entitled "Spray Structure" issued in 1971 the more recent Roberts U.S. Pat. No. 3,638,863 entitled "Sprinkler Unit" issued in 1972 is interesting because it reveals how the field of spray structures of the type to which this invention relates has progressed or changed in the period since 1883 when the Free patent issued. Whereas the structure shown in the Free reference was apparently made of metal and was adapted to be located in an operative location by a non-illustrated structure the more recent patents noted show structures which are made of a polymer or plastic material for cost reasons and which follow the lead of a number of patents in the field so as to include a stake used to mount the disclosed structure in an intended location.

Some U.S. patents including such a stake are: the Fry U.S. Pat. No. 604,036 entitled "Hose Nozzle" issued in 1898; the Le Deit U.S. Pat. No. 2,903,190 entitled "Sprinkler Head" issued in 1959; and the Jacobs U.S. Pat. No. 3,385,525 entitled "Lawn Sprinkler" issued in 1968. It is not considered necessary to cite references to show that the use of a plastic or polymer in the Mominee and Roberts structures instead of metal is a mere substitution of materials unproductive of any unexpected results in a sprinkler structure. As a result of these considerations it is apparent that there must be functional distinctions between these latter two patents and the Free patent.

A brief inspection of the Monimee patent indicates that a distinction or difference between it and the Free patent may or can be alleged to pertain to the adjustment of the position of a distributing tube on the nipple so as to achieve a valving action controlling the flow sprayed outwardly from the device. This is easily confirmed in several ways. In the final sentence of the abstract of the Mominee patent it is indicated that: "By regulating the position of the tube upon the member with respect to the groove it is possible to control the flow of water from within the interior of the tube." The member identified in this quotation can be referred to as a nipple; the groove referenced in it is a passage for the water from the distribution tube pushed on the nipple or member. This difference is also indicated by the designation of the principle structure illustrated in the Mominee patent as ". . . a spray structure or valve 10 . . . ".

In accordance with the Mominee teachings the flow control or valving action achieved with the structures disclosed in this patent are accomplished by the adjustment of the position of the tube used relative to the end of the passage in the nipple or relative to another deflecting surface or wall located generally at the end of the such a passage. Two factors are involved with this: (1) increasing the length of confined passage between the tube and the nipple so as to increase the resistance to flow and (2) decreasing the spacing between the end of the tube and the structure so as to limit the amount of water capable of passing from the end of the tube. Of these two factors the first is considered to be relatively unimportant because of the limited amount of resistance to liquid flow normally involved in this type of device.

An understanding of the present invention does not require a detailed consideration of the issue as to whether or not a valving action as is disclosed in the Mominee patent is or is not anticipated by Free and other references. In connection with this it should, however, be noted that the Free structure is such that as the nipple element on it is screwed into a distribution tube as indicated in this patent the spacing between the end of the tube and the deflecting surface in this reference is decreased. Obviously the more this spacing is decreased the less the flow area between the deflector and the tube. This is bound to influence both the flow through the Free device and the manner in which such flow is distributed or sprayed.

The structure disclosed in the Roberts patent differs from that disclosed in the Mominee patent in that there is no valving action disclosed in connection with it. Spray devices or structures as shown in both of these prior patents do have a common feature in that in each the spray pattern achieved is dependent upon the flow through the groove or passage in the nipple and the way that this flow is deflected outwardly. Both of these references disclose deflecting surfaces which are completely transverse to or sloped with respect to the passages in the nipples employed. Water will tend to splash off of such surfaces so as to more or less oppose the flow through the passages and so as to be distributed outwardly in a somewhat irregular manner which does not produce a uniform, watering action over a comparatively large area adjacent to these devices.

It is believed that it will be apparent from this that prior structures such as are shown in the Mominee and Roberts patents are considered to be disadvantageous in that they do not provide for reasonable control of the spray pattern achieved with such structures. This is considered to be the result of the fact that such structures are of such a character that the spacing between the tubes attached to the nipples used in them and the deflecting surfaces employed in them are capable of being varied depending upon the manner in which they are used. It is also considered to be related to the fact that such prior art structures do not adequately recognize various flow considerations in the area of the deflecting surfaces used in them and, hence, do not provide a manner or mode of construction adequate to obtain a desired, relative uniform flow pattern of sprayed water adjacent to the structures shown by these references.

In no way is the preceding to be taken as indicating that spray devices as shown by the Mominee and Roberts patents are not desirable or utilitarian. They are both. Because of the manner in which they can be manufactured they can be produced in volume at a comparatively nominal cost. They can be easily used. In spite of these factors it is considered that the spray devices as shown by these references are not as desirable as they might be because of the nature of the spray pattern or patterns which can be uniformly and easily be obtained from them under "field" or similar conditions. It is also considered that these prior art devices are not as desirable as they might be because they are constructed in such a manner that a user can only use them to spray a restricted area and does not have the option of altering or changing the area sprayed with them as may be desired.

BRIEF SUMMARY OF THE INVENTION

A broad objective of the present invention is to provided new and improved spray structures or devices which are more desirable than prior art related devices such as those indicated in the preceding discussion and others. A related objective of the invention is to provide spray structures which are not significantly more expensive than the closest related prior art spraying devices and which are not any more difficult to use than these closely related prior art devices but which are more advantageous than such prior art devices in that they can be easily and conveniently used so consistently obtain a desired relatively uniform watering action adjacent to these devices. The invention is also intended to provide spray structures which are advantageous in that they differ from the closet related prior art structures because they are constructed in such a manner that they can be easily used to obtain several spray patterns as may be desired.

In accordance with this invention various objectives as indicated in the preceding can be achieved by providing a spray structure constructed so as to have a body including an elongated nipple means which is adapted to receive the end of a watering tube, a deflecting surface means located so as to receive and deflect water from the tube passing through the nipple means, said structure also including a support for said body so that the entire spray structure can be located in such a manner that the water passing through said nipple means and hitting against the deflecting surface means is directed toward an area to be watered using the spray structure in which the improvement comprises either:

(1) shoulder means located on said body at the extremity of said nipple means closest adjacent to the remainder of said body for limiting the amount that said end of said tube can be moved on said nipple is limited to the length of said nipple, and said deflecting surface means is located so that when said end of said tube is on said nipple and is against said shoulder means said end of said tube and said deflecting means define a slot extending transverse to said nipple means which constricts the spray pattern of water hitting against said deflecting surface means; or (2) said body including two of said nipple means, two of said shoulder means and two of said deflecting surface means, each of said nipple means being associated in a set with one of said shoulder means and one of said deflecting surface means, said sets being different from one another so that said tube can be located on either of said nipple means in order to spray water in either of two different manners; or (3) the combination of (1) and (2).

BRIEF DESCRIPTION OF THE DRAWINGS

Because of the nature of this invention this believed that it is best described in greater detail than is possible in a summary such as the proceeding by referring to the accompanying drawings in which:

FIG. 7 is a front elevational view corresponding to FIG. 5 of a third modified form of a spray structure of the invention which is quite similar to the structure shown in FIGS. 5-6.

FIG. 8 is a cross-sectional view taken at line 8—8 of FIG. 7;

FIG. 9 is a cross-sectional view taken at line 9—9 of FIG. 7;

FIG. 10 is a cross-sectional view taken at line 10—10 of FIG. 7;

FIG. 11 is a partial side elevational view corresponding to the upper part of FIG. 2 showing a fourth modified form of a spray structure in accordance with the invention;

FIG. 12 is a cross-sectional view taken at line 12—12 of FIG. 11;

FIG. 13 is a cross-sectional view taken at line 13—13 of FIG. 11;

FIG. 14 is a partial side elevational view corresponding to the upper part of FIG. 2 showing a fifth modified from of a spray structure in accordance with the invention;

FIG. 15 is a top plan view of the spray structure shown in FIG. 14;

FIG. 16 is a cross-sectional view taken at line 16—16 of FIG. 14;

FIG. 17 is a partial side elevational view corresponding to the upper part of FIG. 2 showing a sixth or additional modified form of a spray structure in accordance with the invention;

FIG. 18 is a cross-sectional view taken at line 18—18 of FIG. 17; and

FIG. 19 is a partial cross-sectional view taken at line 19—19 of FIG. 17.

Figure 1:
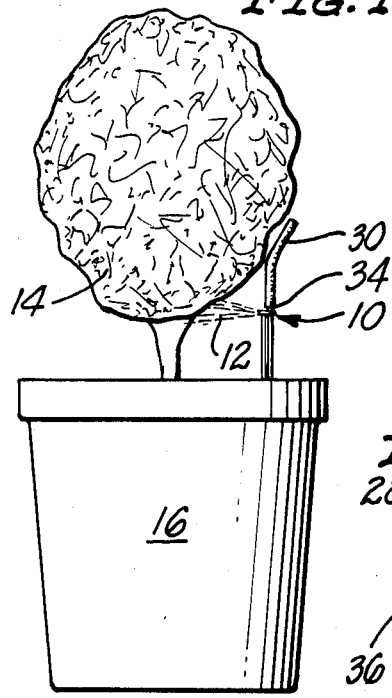
FIG. 1 is a side elevational view of a first presently preferred embodiment of form of a spray structure of the present invention in use in a pot containing a plant.

The different spray structures illustrated in the drawings and subsequently described in detail in the remainder of this specification are constructed so as to utilize various operative concepts or principles of this invention. The latter are set forth and defined in the appended claims forming part of this specification. Those skilled in the design and construction of structures for spraying water over a comparatively small area to water one or more plants will realize that these concepts or principles may be used in differently constructed and differently appearing structures through the use of routine skill in the noted field. For this reason the invention is to be considered as being limited only by the appended claims and is not to be considered as being limited to structures appearing precisely as those illustrated.

DETAIL DESCRIPTION OF THE PREFERRED EMBODIMENTS

In FIG. 1 of the drawings a first spray structure 10 in accordance with this invention is shown in use in creating a spray 12 of water in watering a plant 14 located in a common pot 16. This spray structure 10 and the other spray structures hereinafter identified are all capable of being used in this manner. If desired they may be used in or on the ground instead of in a pot 16 as illustrated.

The particular spray structure 10 illustrated and all of the various other spray structures of the invention hereinafter discussed are preferably formed out of any common, self supporting polymer or polymer composition which is reasonably resistant to ambient weather conditions and which will not be affected by water such as is used for irrigation and related purposes so that each such spray structure is a unitary or one piece body. One of advantages of the present invention is that comparatively inexpensive polymer compositions can be used in manufacturing the various spray structures disclosed herein. It considered particularly important that the structure 10 and that the subsequently designated spray structures in accordance with the invention are designed as hereinafter explained.

When they are so designed that they can be manufactured using a minimum amount of such polymer material by known injection molding techniques using comparatively simple "straight pull" injection molding dies. Because of the configurations of the structure 10 and the various other subsequently described spray structures all of these structures can be manufactured in the noted manner at comparative rapid molding cycles. All of these things are important in making the cost of the disclosed structures reasonably low. This and satisfactory performance of these structures are believed to be critical from a commercial standpoint in the crowded field of this invention.

Figure 2:
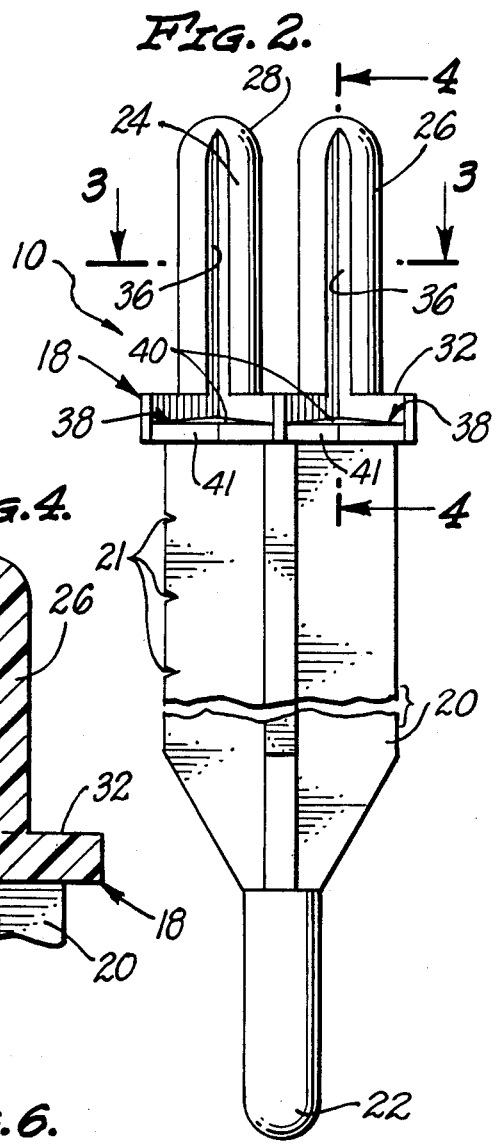
FIG. 2 is a side elevational view of the spray structure shown in the preceding figure at an enlarged scale.
Figures 4, 5, 6:
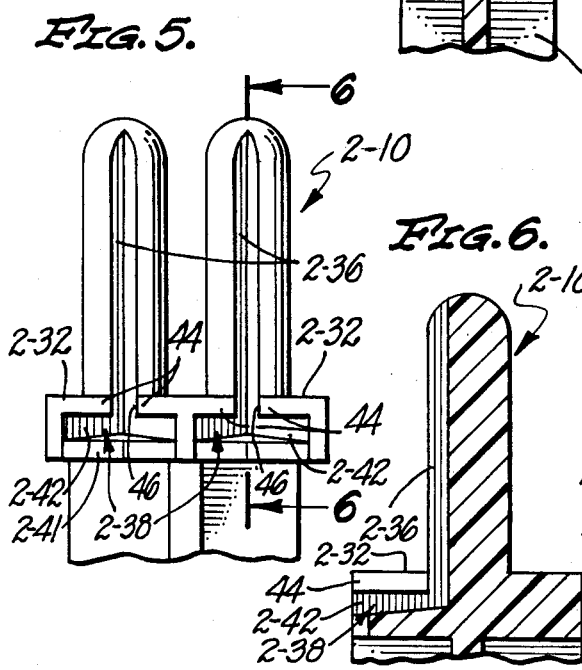
FIG. 4 is a partial cross-sectional view taken at line 4—4 of FIG. 2.
FIG. 5 is a partial side elevational view corresponding to the upper part of FIG. 2 showing a second or modified form of a spray structure in accordance with the invention.
FIG. 6 is a partial cross-sectional view taken at line 6—6 of FIG. 5.
Figure 3:
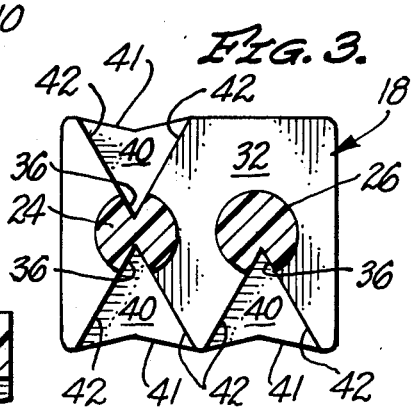
FIG. 3 is a cross-sectional view taken at line 3—3 of FIG. 2.

As indicated in FIGS. 2 to 4 the spray structure 10 includes what may be referred to as a body 18. Attached to it so as to extend downwardly from it is a known type of stake 20 terminating in a nearly pointed, blunt end 22 which is adapted to be inserted into soil (not shown) so as to vertically support the structure 10. The stake 20 is preferably of a cruciform, uniform cross-sectional configuration as shown so as to have a significant resistance to bending yet so as to be as light in weight as reasonably possible. Preferably notches 21 are located along its length so as to indicate the distance the stake 20 is inserted into the ground (not shown). This normally will correspond to the approximate area that will be covered by the spray 12. The end 22 is blunted merely as a safety measure. In the structure 10 two separate, generally cylindrical nipples 24 and 26 project upwardly from the body 18.

These nipples 24 and 26 preferably terminate in rounded upper ends 28 so as to facilitate a flexible, conventional distribution tube 30 as illustrated in FIG. 1 being mounted on either of them by simply being pushed down against a flat upper surface 32 of the body 18. The surface 32 serves as a shoulder means to limit the amount that an end 34 of the tube 30 can be pushed down on either of these nipples 24 and 26 to an amount corresponding to the lengths of these nipples 24 and 26. Preferably they are each of the same length or height and such height approximates the minimum length of these nipples 24 or 26 that is satisfactory to support a tube such as the tube 30 or the structure 10 is manipulated as this structure 10 is being assembled and used.

This is significant in minimizing the amount of polymer material in the structure 10 and in avoiding the structure 10 being used as a valve or flow regulating structure. If desired known holding ribs or projections (not shown) can be located on the nipples 24 and 26 for the purpose of assisting in holding a tube such as the tube 30 in place after such a tube has been assembled on either of these two nipples 24 and 26. The nipples 24 and 26 are constructed so as to include water passages 36 which extend linearly along their lengths and past the surface 32 a short distance in the body 18. Two of these passages 36 are located on opposite sides (not separately numbered) of the nipple 24 whereas only one passage 36 is located on the other nipple 26.

For convenience of manufacture these passages 36 are all identical groves in the nipples 24 and 26. Technically the tube 30 cooperates with the passage 36 or passages 36 within a nipple 24 or 26 on which it is located so as to form an enclosed flow channel or conduit with such passage 36 or passages 36. By virtue of the fact that the passages are identical "V" shaped grooves in the nipples and the fact that an end 34 of a tube 30 cut transverse to the length of the tube in a normal manner will always fit flat against the surface 32 the resistance to flow caused by each identical passage 36 used will always be uniform.

Each of the passages 36 terminates in a generally flat, somewhat triangularly shaped internal cavity 38 within the body 18. These cavities 38 are preferably identical. Each includes a slightly sloping, nearly horizontal bottom deflecting surface 40 having a front discharge edge 41 of a flattened "V" shaped and vertically extending side walls 42 which appear as extensions of the walls (not separately numbered) of the passages 36. The walls 42 shown are located at an acute angle with respect to one another. These defecting surfaces 40 serve to deflect any water hitting against them generally downwardly and outwardly from the structure 10 so as to create the spray 12. An important aspect of the invention is the control of the pattern of the spray achieved.

Preferably the structure 10 will be shaped substantially as shown in order that the shape of the spray 12 will be an approximate of the shape of a sector diverging from an apex or center (not numbered) at about the intersection of the walls 42. Further, the configuration of the spray 12 will be such that this spray 12 extends downwardly from the body 18 so as to initally resemble a flat plane which tends to sag in accordance with the distance from the body 18. This spray 12 will be more or less sheet-like in appearance adjacent to the body 18 and will tend to break up into small droplets to an increasing extent in accordance with the distance from the structure 10.

Preferably the primary factors in obtaining a spray 12 as noted are: (1) the shape of a deflecting surface 40; and (2) the angle of this surface 40. In order to obtain a spray 12 extending in a desired downward and outward manner such that the structure 10 is useful in common pots up to about 12–16 inches (30–38 centimeters) in diameter it is considered that a surface 40 should be located at an acute angle to the horizontal of from about 2 to about 12 degrees and that preferred results are achieved when this angle is from about 5 to about 6 degrees.

The reasons for this will be apparent from the fact that when a surface 40 is completely horizontal a spray 12 from it will initially tend to extend approximately horizontally; the fact that when a surface 40 is at an angle of about 5 degrees to the horizontal that the spray 12 will initially extend downwardly at an angle of about 15 to 20 degrees to the horizontal; and the face that if a surface 40 extends at an angle of about 10 degrees to the horizontal that the spray 12 will initially extend downwardly at an angle of approximately 45 degrees to the horizontal. It is to be noted that these figures have not been obtained with precision and are therefore apt to be slightly in error.

Nevertheless, they demonstrate how by controlling the angle of a surface 40 in a structure 10 it is possible to control the nature of a spray 12. Such control is not only related to the angle of a surface 40. It is also believed to be related to a multiplicity of factors. Included within these is the fact that in effect there is a slot 44 as indicated by dotted lines associated with each surface 40. Each slot 44 can be considered to be defined by the portion (not separately identified) of the end 34 of a tube 30 opposite a surface 40, the portion (not separately identified) of the surface 40 opposite the noted portion of the end 34 and the connecting areas (not separately identified) of the walls 42. Each slot 44 is believed to act more or less as a nozzle.

However, this can be somewhat misleading. Where the end 34 is contacted by deflected water it will tend to direct such water into the main stream flowing past it. Similarily water contacted by the walls 42 will tend to be deflected back toward such a stream. Presumably as a result of these factors and as a result of these factors and as a result of the Coanda effect the water passing from the body 18 will initially be a flat planar stream in which turbulent conditions exist. Further, this stream is of such a character that initially it appears more or less as a "sheet" of water which tends to break up into visible droplets to an increasing extend in accordance with the distance from the structure 10.

With the spray structure 10 a type of spray as described can be achieved as either or both of the nipples 24 and 26 are used. Normally only one of these nipples 24 and 26 will be used at any one time. These two nipples 24 and 26 are employed so as to give a user an option as to the manner in which water is distributed at any one time. Although it would be possible to form these nipples 24 and 26 so that each of them included a single passage 36 and so that the cavities 38 in communication with these passages 36 were different in order to obtain different spray pattern it is considered preferable to use two nipples 24 and 26 as shown and described so that a user can water significantly different areas as may be desirable in a particular circumstance.

In FIGS. 5 and 6 of the drawings there is shown a second form of a spray structure in accordance with this invention which is quite closely related to the spray structure 10 described in the preceding. Because of the close relationship between these structures and the fact that various parts of them directly correspond it is considered desirable to designate this second structure and the various parts of it using the numerals previously employed preceded by "2-". Thus, the spray structure illustrated in FIGS 5 and 6 is designated herein and in the drawing by the numeral 2-10, the body 18 of this structure 2-10 is designated by the numeral 2-18 and so on. No part of the structure 2-10 which is substantially the same as a part of the structure 10 is separately discussed in detail herein in the interest of brevity.

The spray structure 2-10 differs from the spray structure 10 in that the surface 2-32 in it is extended over the cavity 2-38 so as to provide horizontally extending walls 44 which substantially cover the cavity 2-38 except where it is covered by a part of the end 2-34 of a tube 2-30 as indicated in phanton if FIG. 5. The walls 44 are separated by a small slot 46. The latter is present only to simplify the dies used in molding the structure 2-10 since it allows straight pull dies to be used in forming the passages 2-36. Also the edge 2-41 is non-linear and of a somewhat "V" appearance as illustrated, so as to make the surface 2-40 vary between the walls 2-42 in such a manner as to be shortest between these walls 2-42.

The walls 44 are used to obtain a greater degree of control of a spray pattern than can be obtained with the spray structure 10. In the latter only the end 34 of the tube 30 serves to "hold down" the flow of any upwardly and outwardly deflected water which might tend to diverge from the principal spray 1-12. In the structure 2-10 the walls 44 tend to serve this function over a comparatively large area.

The "V" configuration of the edge 2-41 is considered to be significant since with this edge 2-41 there appears to be less tendency for a spray such as the spray 12 obtained to be more uniform than when a straight edge 41 is used. This "V" configuration appears to accomplish this by causing a reduction in the water at or along the edges of the spray produced. The reasons for this are unclear but appear to be related to an application of the Coanda effect resulting from the length of the path of water at the center of the surface 2-40 than along the walls 2-42 and gradually increasing toward these walls 2-42.

Although the structure 10 can be used to adequately control such flow at times it is considered necessary or desirable to have a greater degree of control such that virtually all of the spray produced extends outwardly in substantially a horizontal pattern as it leaves a spray structure and such that the uniformity of the water distribution is improved. The spray structure 2-10 is intended to provide such a substantially horizontal spray pattern.

In FIG. 7-10 of the drawings there is shown a structure which is quite similar to the structure 2-10. Because of this relationship this FIG. 7 structure and various parts of it are designated using the prefix "3-" with the numbers employed in the preceding. In the structure 3-10 the surfaces 3-40 are not flat but are of a shape corresponding to part of a surface of a cone so that the central regions (not separately numbered) of these surfaces 3-40 are located at a lesser angle to the horizontal than the edge (not separately numbered) of the surfaces 3-40 located immediately adjacent to the walls 3-42. Further, the edge 3-41 when viewed from the top is curved so as that the distance from the juncture (not separately numbered) of the walls 3-42 along the surface 3-40 is longer than midway between these walls 3-42.

The edge 3-41 is curved in this manner in order to obtain a spray pattern which is believed to be slightly more desirable, for some purposes than can be obtained with an edge 2-41 as previously described of a "V" configuration along its length. The surface 3-40 is also slightly curved or bowed as shown as to also provide a spray pattern which is more desirable for some purposes than that obtained by previously described surfaces 40 or 2-40. With both of the expedients shown in FIGS. 7-10 it is possible to obtain a spray pattern having an outline which somewhat approximates the outline of a part of a circular pot.

In FIGS 11-13 of the drawings there is shown a fourth form of a spray structure in accordance with this invention which is also quite closely related to the spray structures 10 and 2-10 described in the preceding. Because of the close relationship between these structures and the fact that various parts of them directly correspond, it is considered desirable to designate this third structure and the various parts of it using the numerals previously employed preceded by "4-". Thus, the spray structure illustrated in FIGS. 9-12 is designated herein and in the drawing by the numeral 4-10, the body 18 of this structure 4-10 is designated by the numeral 4-18 and so on. No part of the structure 4-10 which is substantially the same as a part of the structure 10 of the structure 2-10 is separately discussed in detail herein in the interest of brevity.

The spray structure 4-10 differs from the spray structure 2-10 in two manners. First, it modifies the dimensions of the previoulsy described walls 44 so as to utilize walls 4-44 which extend outwardly from the body 4-18 a comparatively short distance as illustrated. Secondly, the cavities 4-38 in the structure 4-10 are broader than the cavities 38 used in the prior structures 10 and 2-10 in that the walls 4-42 are located at an obtuse angle relative to one another whereas the walls 42 and 2-42 are located at an acute angle with respect to one another.

This spray structure 4-10 differs from the other spray structures 1- and 2-10 previously described in the manners noted since it is intended to be used in obtaining a comparatively wide or broad spray. As a result of a consideration of the operation of other spray structures reasonably corresponding to the structures 10 and 2-10 it was considered that a modified configuration as noted in 4-10 would be desired to obtain a relatively uniform distribution of water over a comparatively wide or broad area. When they are located as indicated the tendency for water to deflected off of one wall 4-42 and onto the other wall 4-42 is less than with the previously described structures 1- and 2-10. It is presently considered that the overhanging nature of the walls 4-44 is desirable in minimizing extraneous, upwardly directed spray and in maintaining a desired spray pattern.

In FIGS. 14-16 of the drawings there is shown a fifth form of a spray structure in accordance with this invention which is quite closely related to the spray structures 10, 2-10 and 3-10 described in the preceding. Because of the close relationship between these structures and the fact that various parts of them directly correspond it is considered desirable to designate this fourth structure and the various parts of it using the numerals previously employed preceded by "5-". Thus, the spray structure illustrated in FIGS. 13-15 is designated herein and in the drawing by the numeral 5-10, the body 18 of this structure 4-10 is designated by the numeral 5-18 and so on. No part of the structure 5-10 which is substantially the same as a part of the structure 10 or any other previously described structure is separately discussed in detail herein in the interest of brevity.

The structure 5-10 can be regarded as being substantially identical to the structure 10 except in one important regard. In it the nipples 5-24 and 5-26 are directed downwardly instead of being directed upwardly. As a result of this a tube (not shown) corresponding to the tube 30 can be assembled on either of this nipples 5-24 and 5-26 by being pushed upwardly on them instead of being pushed downwardly on them. If desired such a tube could be threaded through several holes 48 in the stake 5-20 so as to minimize the tendency of gravity to result in such a tube tending to fall off of a nipple 5-24 or 5-26. As a result of this use of downwardly extending nipples 5-24 and 5-26. several minor changes have had to be made in connection with the body 5-18 of the structure 5-10. As will be apparent from the drawing it is more or less of a flat, plate-like shape in the structure 5-10 and includes a small vertical wall 50 holding another top wall 52 located opposite the two passages 5-36 in the nipple 5-24.

In FIGS. 17-18 of the drawings there is shown a sixth form of a spray structure in accordance with this invention which is quite closely related to the spray structure 10, 2-10, 3-10, 4-10, 5-10 described in the preceding. Because of the close relationship between these structures and the fact that various parts of them directly correspond it is considered desirable to designate this firth structure and the various parts of it using the numerals previously employed preceded by "6-". Thus, the spray structure illustrated in FIGS. 16-18 is designated herein and in the drawing by the numeral 6-10, the body 18 of this structure 6-10 is designated by the numeral 6-18 and so on. No part of the structure 6-10 which is substantially the same as a part of the structure 10 or any other previously described structure is separately discussed in detail herein in the interest of brevity.

The structure 6-10 is most closely related to the structure 5-10 indicated in the preceding. It differs from this previously described structure 5-10 in that employs a split stake 6-20 which in effect has two legs 54 instead of one. This provide a sort of a bridge type appearance such that a tube (not shown) attached to any of the nipples 6-24 and 6-26 employed are not apt be come knocked off these nipples as the structure 6-10 is used. Further, this structure 6-10 adds a nipple 56 which is the same as the nipple 6-26 except that it is directed off in a different direction than the nipple 6-26. This gives a user a degree of latitude as to the spray pattern to be obtained depending upon how a tube or how tubes are used with this spray structure 6-10.

I claim:

1. A one-piece unitary spray structure constructed so as to have a body including a stake at one end thereof and an elongated nipple means which is adapted to receive the end of a water tube, a deflecting surface means located so as to receive and deflect water from the tube passing through the nipple means, said structure also including a support for said body so that the entire spray structure can be located in such a manner that water passing through said nipple means and hitting against the deflecting surface means is directed toward an area to be watered using the spray structure in which the improvement comprises:

shoulder means located on said body at the extremity of said nipple means closest adjacent to the remainder of said body for limiting the amount that said end of said tube can be moved on said nipple means is limited to the length of said nipple means, and said deflecting surface means is located so that when said end of said tube is on said nipple means and is against said shoulder means said end of said tube and said deflecting means define a slot extending transverse to said nipple means which constricts the spray pattern of water hitting against said deflecting surface means, said body includes a generally horizontal cavity located therein, said slot extending across the interior of said cavity, said deflecting surface means serving as the bottom of said cavity said cavity having vertically extending side walls located at an angle with respect to one another, said deflecting surface means is a surface extending at an acute angle of from about 2 to about 12 degrees to the horizontal which slopes downwardly away from said nipple means, said body includes wall means spaced from and extending above and in substantially the same direction as said deflecting surface means, said wall means being located so as to extend outwardly away from slot.

2. A spray structure as defined in claim 1, wherein: said acute angle is an angle of from about 5 to about 6 degrees.

3. A spray structure as claimed in claim 1 wherein: said deflecting surface is shaped so that said angle is greater adjacent to the edges of said deflecting surface means than between said edges.

4. A spray structure as claimed in claim 1 wherein: said deflecting surface is curved so as to have the shape of a portion of the surface of a cone.

5. A spray structure as claimed in claim 1 wherein: said deflecting surface means has diverging side walls and a discharge edge extending between said side walls, said discharge edge being non-linear and shaped so that the length of said deflecting surface means is shorter at the center of said discharge edge than along said side walls.

6. A spray structure as claimed in claim 1 wherein: said side walls are located at an acute angle with respect to one another.

7. A spray structure as claimed in claim 1 wherein: said side walls are located at an obtuse angle with respect to one another.

8. A spray structure as claimed in claim 1 wherein: said nipple means extends vertically downward from said body.

9. A spray structure as claimed in claim 1 wherein: said support includes means for holding said tube so that it will not slip off of said nipple means due to the action of gravity.

10. A spray structure as claimed in claim 1 wherein: said nipple means includes a grove located in its periphery, said grove and the adjacent portion of the interior of said watering tube serving as a passage means for conveying water through said nipple toward said deflection surface means, and said deflection surface means has diverging side walls and a discharge edge extending between said side walls, said discharge edge being non-linear and shaped so that the length of said deflecting surface means is shorter at the center of said discharge edge than along said side walls.

11. A spray structure constructed so as to have a body including an elongated nipple means which is adapted to receive the end of a watering tube, a deflecting surface means located so as to receive and deflect water from the tube passing through the nipple means, said structure also including a support for said body so that the entire spray structure can be located in such a manner that the water passing through said nipple means and hitting against the deflecting surface means is directed toward an area to be watered using the spray structure in which the improvement comprises:

said body is a one piece, unitary body including two of said nipple means extending therefrom and located adjacent to one another, two of said shoulder means and two of said deflecting surface means, said shoulder means being located generally beneath said nipple means, said deflecting surface means being located beneath and being spaced from said deflecting surface means, each of said nipple means being associated in a set with one of said shoulder means and one of said deflecting surface means, said sets being different from one another so that said tube can be located on either of said nipple means in order to spray water in either of two different manners.

12. A spray structure as claimed in claim 11 wherein: said body is shaped so that one of said sets includes two separate passage means each of which is directed toward an associated deflecting surface means and the other of said sets includes one of said passage means directed toward an associated deflecting surface means.

13. A spray structure constructed so as to have a body including an elongated nipple means which is adapted to receive the end of a watering tube, a deflecting surface means located so as to receive and deflect water from the tube passing through the nipple means, said structure also including a support for said body so that the entire spray structure can be located in such a manner that water passing through said nipple means and hitting against the deflecting surface means is directed toward an area to be watered using the spray structure in which the improvement comprises:

shoulder means located on said body at the extremity of said nipple means closest adjacent to the remainder of said body for limiting the amount that said end of said tube can be moved on said nipple is limited to the length of said nipple, and said deflecting surface means is located so that when said end said tube is on said nipple and is against said shoulder means said end of said tube and said deflecting means define a slot extending transverse to said nipple means which constricts the spray pattern of water hitting against said deflecting surface means; and said body is a one piece unitary body including two of said nipple means extending therefrom and located adjacent to one another, two of said shoulder means and two of said deflecting surface means, each of said nipple means being associated in a set with one of said shoulder means and one of said deflecting surface means, each of said shoulder means being located between its associated nipple means and its associated deflecting surface means, said sets being different from one another so that said tube can be located on either of said nipple means in order to spray water in either of two different manners.

14. A spray structure as claimed in claim 13 wherein:
said body is shaped so that one of said sets includes two separate passage means, each of which is directed toward an associated deflecting surface means and the other of said sets includes one of said passage means directed toward an associated deflecting surface means.

15. A spray structure as claimed in claim 14 wherein:
each of said deflecting surface means is a surface extending at an acute angle to the horizontal which slopes downwardly away from said nipple means.

16. A spray structure as claimed in claim 14 wherein:
said body includes a generally horizontal cavity located therein which is associated with one of said nipple means, said slots extending across the interiors of said cavities, said deflecting surface means serving as the bottoms of said cavities, said cavities having vertically extending side walls located at an angle with respect to one another.

17. A spray structure as claimed in claim 16 wherein:
said body includes wall means extending above each of said deflecting surface means, said wall means being located so as to extend outwardly away from said slots.

18. A spray structure as claimed in claim 13 wherein:
said body includes a generally horizontal cavity located therein associated with each of said nipple means, said slots extending across the interiors of said cavities, said deflecting surface means serving as the bottom of said cavities, said cavities having vertically extending side walls located at an angle with respect to one another,
said body includes wall means extending above each of said deflecting surface means, said wall means being located so as to extend outwardly away from said slots, and
each of said nipple means includes a groove located in its periphery, said grooves and the adjacent portions of the interior of said watering tube each serving as a passage means for conveying water through said nipple means toward said deflection surface means.

* * * * *